(12) United States Patent
Hong

(10) Patent No.: US 6,344,077 B1
(45) Date of Patent: Feb. 5, 2002

(54) AQUEOUS CELLULOSE SOLUTION AND RAYON FIBER PRODUCED FROM THE SAME

(76) Inventor: Young-keun Hong, 1-1508 Sunkyung Apt., 506 Daechi-dong, Kangnam-gu, Seoul (KR)

( * ) Notice: Subject to any disclaimer, the term of this patent is extended or adjusted under 35 U.S.C. 154(b) by 0 days.

(21) Appl. No.: 09/423,810

(22) PCT Filed: May 12, 1998

(86) PCT No.: PCT/KR98/00119

§ 371 Date: Feb. 2, 2000

§ 102(e) Date: Feb. 2, 2000

(87) PCT Pub. No.: WO98/51709

PCT Pub. Date: Nov. 19, 1998

(30) Foreign Application Priority Data

May 13, 1997 (KR) ............................................. 97-18444
Apr. 7, 1998 (KR) ............................................. 98-12177

(51) Int. Cl.$^7$ ............................... C08L 99/00; C08L 1/08
(52) U.S. Cl. ................................ 106/162.2; 106/162.8; 106/162.9
(58) Field of Search ........................... 106/162.2, 162.8, 106/162.9

(56) References Cited

U.S. PATENT DOCUMENTS 2,480,949 A  *  9/1949  Morison ...................... 106/197

OTHER PUBLICATIONS

Caplus 1994: 10351, Biologically degradable nonwoven fabrics, Yabe et al., Abstract of JP 05–186945 A2, (Jul. 1993).*

* cited by examiner

*Primary Examiner*—David Brunsman
(74) *Attorney, Agent, or Firm*—Leydig, Voit, & Mayer, Ltd.

(57) ABSTRACT

An aqueous cellulose solution containing chitosan and/or chitosan derivatives, or alternatively alginic acid and/or alginic acid derivatives, and water-soluble and antibacterial rayon fiber produced from the cellulose solution. The aqueous cellulose solution includes a first component containing at least one selected from the group consisting of alkali cellulose and cellulose derivatives, and a second component containing at least one selected from the group consisting of soluble chitosan and chitosan derivatives, or alternatively at least one selected from the group consisting of soluble alginic acid and alginic acid derivatives, wherein the first and second components are homogeneously mixed without phase separation. The rayon fiber obtained by wet-spinning the aqueous cellulose solution shows antibacterial property or flame-retardancy depending on the composition of the cellulose solution, and water-solubility or water-resistance depending on the composition of a coagulating bath.

20 Claims, No Drawings

AQUEOUS CELLULOSE SOLUTION AND RAYON FIBER PRODUCED FROM THE SAME

This is a 371 of PCT/KR98/00119 filed May 12, 1998.

BACKGROUND OF THE INVENTION

1. Field of the Invention

The present invention relates to an aqueous cellulose solution and a rayon fiber produced from the same, and more particularly, to an aqueous cellulose solution containing chitosan and/or chitosan derivatives, or alginic acid and/or alginic acid derivatives, and a water-soluble and antibacterial rayon fiber produced from the solution.

2. Description of the Related Art

In general, a polymer such as rubber, leather, paper, plastic and fiber is not soluble in water. However, water-soluble polymers are also important even though such kind of polymer are few. Water-soluble polymers have been widely used in pharmaceuticals, cosmetics, foods and fiber industries.

Meanwhile, cellulose as a major component of a cell membrane of plants is a linear polymer substance in which D-glucose units are connected by a β-glucosidic ether bond. Cellulose is not soluble in water due to strong internal bond such as intra- and inter-molecular hydrogen bonds, inter-molecular van der Waals bonds, and high degree of crystallinity caused from intrinsic rigidity. Thus, in order to make cellulose water-soluble, intra- and inter-molecular hydrogen bonds, and inter-molecular van der Waals bonds must be broken. Such solubilized cellulose includes carboxymethyl cellulose, hydroxypropyl cellulose, sulfated cellulose, etc. However, these cellulose are cellulose derivatives which cannot be regenerated back into cellulose because their molecular structures are permanently changed.

In order to produce rayon fiber while maintaining the molecular structure of cellulose, cellulose solution containing sodium cellulose xanthate or cuprammonium cellulose is prepared, and then spun into a coagulating bath, thereby regenerating cellulose. However, reagent such as carbon disulfide $CS_2$ and Schweitzer's reagent, used to prepare the cellulose solution containing cellulose xanthate or cuprammonium cellulose, are fatally poisonous to humans and pollutes the environment.

Thus, researches have been actively and widely conducted to find a method to solubilize cellulose while minimizing the current pollution problems. As a result, DMF/$N_2O_4$ solvent, DMSO/paraformaldehyde solvent, $NH_3$/$NH_4SCN$ solvent, DMAc/LiCl solvent, and NMMO (N-methylmorpholine-N-oxide) solvent have been developed. However, cellulose solutions prepared by such solvent systems are organic solutions, not aqueous solutions, so that costs required for recovering the solvents are high.

Thus, the present inventor has conducted numerous experiments to obtain an aqueous cellulose solution without causing the above problems, and provided an aqueous cellulose solution in a homogeneous phase. The aqueous cellulose solution is obtained by mixing ambidextrous cellulose having a negative charge or positive charge depending on the peripheral circumstances with a water-soluble polymer having the same negative or positive charge as that of the ambidextrous cellulose. Accordingly, in the aqueous solution, cellulose is easily dispersed into the water-soluble polymer by the electrical repelling force, thus providing homogeneous aqueous cellulose solution in which cellulose is mixed with the water-soluble polymer homogeneously at the molecular level. Also, the present inventor has noticed that a fiber or film formed by wet-spinning the homogeneous cellulose solution into a coagulating bath such as low-temperature water or acetone has water-soluble or water-resistant property depending on the composition of the coagulating bath, and also has antibacterial property.

SUMMARY OF THE INVENTION

To solve the above problems, it is an objective of the present invention to provide an aqueous cellulose solution capable of minimizing the problems of pollution.

It is another objective of the present invention to provide a rayon fiber produced from the aqueous cellulose solution.

Accordingly, to achieve the first objective, there is provided an aqueous cellulose solution comprising: a first component containing at least one selected from the group consisting of alkali cellulose and cellulose derivatives; and a second component containing at least one selected from the group consisting of soluble chitosan and chitosan derivatives, or alternatively at least one selected from the group consisting of soluble alginic acid and alginic acid derivatives, wherein the first and second components are homogeneously mixed without phase separation.

To achieve the second objective, there is provided a rayon fiber produced by wet-spinning an aqueous cellulose solution into a coagulating bath, wherein the aqueous cellulose solution comprises: a first component containing at least one selected from the group consisting of alkali cellulose and cellulose derivatives; and a second component containing at least one selected from the group consisting of soluble chitosan and chitosan derivatives, or alternatively at least one selected from the group consisting of soluble alginic acid and alginic acid derivatives, and the first and second components are homogeneously mixed without phase separation.

Preferably, the total content of the first and second components is 4~12 wt % based on the total weight of the cellulose solution.

Preferably, the cellulose derivative is at least one selected from the group consisting of carboxymethyl cellulose, hydroxyethyl cellulose, hydroxypropyl cellulose, sulfated cellulose, methyl cellulose, ethyl cellulose, n-propyl cellulose and isopropyl cellulose.

Preferably, the chitosan derivative is at least one selected from the group consisting of alkali chitin, carboxymethyl chitin, hydroxypropyl chitosan, sulfated chitosan, succinyl chitosan, chitosan lactate, sodium chitosan acetate and quaternary ammonium salt of chitosan.

Preferably, the quaternary ammonium salt of chitosan is at least one selected from the group consisting of trimethylammonium chitosan halide, triethylammonium chitosan halide and triisopropylammonoum chitosan halide.

Preferably, the alginic acid derivative is at least one selected from the group consisting of sodium alginate, calcium alginate, potassium alginate and magnesium alginate.

Preferably, the cellulose solution further comprises a base compound of 0.01~5 wt % based on the total weight of the cellulose solution, and the base compound is at least one selected from the group consisting of sodium hydroxide (NaOH), potassium hydroxide (KOH), calcium hydroxide (Ca(OH)$_2$) and magnesium hydroxide (Mg(OH)$_2$).

Preferably, the coagulating bath is water.

Preferably, the coagulating bath is water containing 5~25 wt % of at least one selected from the group consisting of zinc sulfate, sodium sulfate, ammonium sulfate, sodium chloride and calcium chloride.

Preferably, the coagulating bath is water containing 3~8 wt % of at least one selected from the group consisting of chitosan and chitosan derivatives, and 5~25 wt % of at least one selected from the group consisting of zinc sulfate, sodium sulfate, ammonium sulfate, sodium chloride and calcium chloride.

Preferably, the coagulating bath is water containing 3~8 wt % of at least one selected from the group consisting of alginic acid and alginic acid derivatives, and 5~25 wt % of at least one selected from the group consisting of zinc sulfate, sodium sulfate, ammonium sulfate, sodium chloride and calcium chloride.

Preferably, the temperature of the coagulating bath is 4~15° C.

DESCRIPTION OF THE PREFERRED EMBODIMENTS

An aqueous cellulose solution of the present invention is obtained by dissolving a mixture containing alkali cellulose and/or cellulose derivatives as a first component, and a water-soluble chitosan and/or derivatives thereof, or a water-soluble alginic acid and/or derivatives thereof, as a second component, in water at room temperature.

In the present invention, in general, cellulose can be separated and purified from wood. Cellulose and cellulose derivatives having a degree of polymerization of 300~600 are favorable in terms of convenience in the spinning process, and material properties of rayon fiber produced therefrom. If the degree of polymerization is less than 300, mechanical strength of the rayon fiber obtained therefrom is not satisfactory. If the degree of polymerization exceeds 600, it is difficult to smoothly perform the solubilization. Cellulose may be obtained from cotton linter or recycled rayon and paper other than wood pulp.

In the present invention, because cellulose is water-insoluble alkali cellulose is used, which is allowed to swell through a pre-treatment using a base compound. Also, cellulose derivatives used in the present invention other than alkali cellulose include carboxymethyl cellulose, hydroxyethyl cellulose, hydroxypropyl cellulose, sulfated cellulose, methyl cellulose, ethyl cellulose, n-propyl cellulose and isopropyl cellulose. Because the cellulose derivatives dissolve well in water, the pre-treatment using the base compound is not necessary.

Chitosan is a polysaccharide obtained by deacetylating chitin. That is, after treating the shell of Crustacea, the insect species and mold with acid, a treatment using a base compound is performed to separate and purify protein and calcium carbonate, resulting in chitin. Then, the obtained chitin is heated in sodium hydroxide solution for deacetylation. Chitosan, showing excellent water-retention properties, has similar molecular structure to cellulose, so it can be mixed homogeneously with cellulose. Also, amino group coupled to $C_2$ of a glucose ring of the chitosan is basic, that is, positive ionic, so chitosan and derivatives thereof bind with microbes, dye, acid rain, etc. having negative ionic property, thereby providing antibacterial properties and improved dyeing property and acid rain neutralizing property.

In the present invention, "soluble chitosan" means a water-soluble chitosan whose degree of deacetylation is controlled to approximately 45~55% during the deacetylation from chitin. If chitosan changes into chitosan derivatives, solubility increases. In particular, if the amino group becomes a quaternary ammonium salt, positive ionic property increases, thereby further improving solubility, antibacterial and dyeing properties, and acid rain neutralizing property.

Chitosan derivatives used in the present invention includes alkali chitin, carboxymethyl chitin, hydroxypropyl chitosan, sulfated chitosan, succinyl chitosan, chitosan acetate, chitosan lactate, sodium chitosan acetate and quaternary ammonium salt of chitosan. The quaternary ammonium salt chitosan includes trimethylammonium chitosan halide, triethylammonium chitosan halide and triisopropylammonoum chitosan halide. The quaternary ammonium salt chitosan is obtained by reacting the amino group of chitosan with alkyl halide. Alkyl halide for this purpose includes methylchloride, methyliodide, methylbromide, ethylchloride, methyliodide, ethylbromide, n-propylchloride, n-propyliodide, n-propylbromide, isopropylchloride, isopropyliodide and isopropylbromide. If an alkyl halide having a longer alkyl group than methyl, ethyl, propyl and isopropyl is used, the reaction into the quaternary ammonium salt is slow and difficult to occur.

Alginic acid is a polysaccharide obtained by processing a sodium carbonate extraction solution of dry seaweed such as brown seaweed and tangle with acid. Alginic acid has the same molecular structure as cellulose except that hydroxymethyl group coupled to $C_6$ of glucose ring is substituted by a carboxyl group, so it can be mixed homogeneously with cellulose. Alginic acid has excellent water-retention properties, a slight antibacterial property, and flame retardancy. Alginic acid can be solublized in water by processing with a base compound such as sodium hydroxide (NaOH). In particular, alginic acid derivatives such as sodium alginate, calcium alginate, potassium alginate and magnesium alginate are highly soluble in water.

The aqueous cellulose solution of the present invention is a homogeneous mixture, without phase separation, of a first component containing the alkali cellulose or cellulose derivatives, and a second component containing soluble chitosan or chitosan derivatives. Here, the content of the second component is 0.1~50 wt % based on the total weight of the first component, and the second component may be alginic acid or an alginic acid derivative instead of chitosan or an chitosan derivative. If the content of the second component is less than 0.1 wt %, the antibacterial property of the rayon fiber produced from the cellulose solution is poor. On the other hand, if the content of the second component exceeds 50 wt %, mechanical properties of the resultant rayon fiber are lowered.

Also, the aqueous cellulose solution of the present invention may further include a base compound which has not been completely removed after alkali cellulose, chitosan and/or chitosan derivatives, or alginic acid and/or alginic acid derivatives are obtained. The base compound includes sodium hydroxide (NaOH), potassium hydroxide (KOH), calcium hydroxide ($Ca(OH)_2$) and magnesium hydroxide ($Mg(OH)_2$). The base compound is controlled to be 0.01~5 wt % based on the total content of the aqueous cellulose solution. If the content of the base compound exceeds 5 wt %, cellulose does not solubilize well.

The aqueous cellulose solution of the present invention is mainly used for making rayon fiber. However, the aqueous cellulose solution can be applied to food and cosmetics industries. That is, in the aqueous cellulose solution, the cellulose is easily decomposed by yeast or bacteria into oligomers such as cellopentaose and cellohexaose, or monomers such as glucose. Here, the obtained oligomers are used as raw material for cosmetics industry, and the monomers by the food industry. Also, the rayon fiber obtained by spinning the aqueous cellulose solution has an antibacterial property or flame retardancy as well as the intrinsic properties of the cellulose fiber such as a high hygroscopic property and a suitable mechanical property. Here, the antibacterial property or flame retardancy is caused by addition of chitosan and/or chitosan derivatives or alginic acid and/or alginic acid derivatives.

Hereinafter, a method of producing rayon fiber using the cellulose solution will be described.

The rayon fiber is obtained by wet-spinning the aqueous cellulose solution into a coagulating bath at a low temperature. Preferably, the temperature of the cellulose solution is controlled to be 15~25° C. If the temperature of the solution is less than 15° C., spinning is difficult due to high viscosity. Meanwhile, if the temperature of the solution is higher than 25° C., the texture of the fiber is not smooth because the rayon fiber is rapidly cooled in the coagulating bath. Preferably, the coagulating bath is water of 4~15° C. (first coagulating bath) containing 5~25 wt % of at least one selected from the group consisting of zinc sulfate, sodium sulfate, ammonium sulfate, sodium chloride and calcium chloride, water of 4~15° C. (second coagulating bath) containing 3~8 wt % of chitosan and/or chitosan derivatives and 5~25 wt % of at least one selected from the group consisting of zinc sulfate, sodium sulfate, ammonium sulfate, sodium chloride and calcium chloride, or water of 4~15° C. (third coagulating bath) containing 3~8 wt % of alginic acid or alginic acid derivatives and 5~25 wt % of at least one selected from the group consisting of zinc sulfate, sodium sulfate, ammonium sulfate, sodium chloride and calcium chloride. Also, the coagulating bath may be water of 4~15° C. or acetone of 10~15° C. containing no additives such as inorganic salts, chitosan, chitosan derivatives, alginic acid, or alginic acid derivatives.

When spinning the aqueous cellulose solution into the coagulating bath, electric charges of cellulose are neutralized by the additives of the coagulating bath, and hydration water is decreased, causing coagulation. The obtained rayon fiber shows water-solubility at approximately 40~90° C.

Meanwhile, in order to produce a rayon fiber which is resistant to boiling water, the third coagulating water must be used when the soluble chitosan and/or chitosan derivatives are used as the second component of the aqueous cellulose solution, and the second coagulating water when the alginic acid and/or alginic acid derivatives are used as the second component. This is because chitosan and/or chitosan derivatives, which is a positive ion polyelectrolyte of the aqueous cellulose solution, are electrically coupled with alginic acid and/or alginic acid derivatives, which is a negative ion polyelectrolyte of the coagulating bath, or alginic acid and/or alginic acid derivatives, which is a negative ion polyelectrolyte of the aqueous cellulose solution, are coupled with chitosan and/or chitosan derivatives, which is a positive ion polyelectrolyte of the coagulating bath, by electrical affinity, to form a rigid gel which is stable at high temperatures.

Meanwhile, solubility (or water-resistance) and tensile strength of the rayon fiber are changed by the content of chitosan and/or chitosan derivatives, or alginic acid and/or alginic acid derivatives of the aqueous cellulose solution. In order to provide water-resistivity, antibacterial property and tensile strength which are suitable for practical use, preferably, the content of chitosan and/or chitosan derivatives, or alginic acid and/or alginic acid derivatives is 0.1~50 wt % based on the total weight of the alkali cellulose and/or cellulose derivatives. If the content of chitosan and/or chitosan derivatives, or alginic acid and/or alginic acid derivatives is less than 0.1 wt %, antibacterial property is lowered. If the content thereof is more than 50 wt %, mechanical properties are lowered.

The present invention will be described through the following examples. However, the present invention is not limited to the following examples. In the following examples, performance tests on the produced rayon fiber were performed by the following methods.

(1) Water Solubility (or Water-resistance)

The produced rayon fiber was stirred in water while increasing temperature, and the temperature at which the rayon fiber solublized was measured.

(2) Tensile Strength and Extension Ratio

Tensile strength and extension ratio of the rayon fiber were measured by using a tensile strength measuring equipment (Model UTM 4201, Instron, USA) at room temperature. Here, the sample was 25 mm long, and the extension rate was 10 mm/min.

(3) Antibacterial Property

Antibacterial property test was performed by an agar plate culture method (halo test) based on KS K0692. *Styphylococcus aureus* as a gram-positive bacteria and *Klepsiella pneumoniae* as a gram-negative bacteria were used. After inoculating the bacteria in the agar plate cultivated in a petri dish, 20 strings of fiber were put on the agar plate, and then incubated for 24 hours. Then, the antibacterial property was evaluated and labeled as S, M or I, depending on the size of germs' propagation blocking zone (hallo caused by inhibition of germs' propagation). Here, "S", "M" and "I" are abbreviations of adjectives "sufficient", "moderate" and "insufficient", which describes the degree of antibacterial property.

EXAMPLES

Preparation of Alkali Cellulose

Cellulose pulp having a degree of polymerization of 1180 (Rayonex P, Rayonex Co.) was treated with NaOH solution of 10 wt % at room temperature for 10 days. Then, the reaction product was neutralized to pH 7 with acetic acid, and filtered and then dried, resulting in an alkali cellulose having a degree of polymerization of approximately 500.

Extraction of Chitin

After removing the flesh of a crab (red crab, YoungDuck, KangWon-do, Korea), the shell was washed and then dried. After soaking the shell in 2N HCl for 24 hours at room temperature, the product was soaked in 1N NaOH solution for 36 hours at 90° C., and then treated with ethanol for 6 hours, resulting in pure chitin.

Preparation of Chitosan

The extracted chitin was soaked in 2N HCl for 40 hours at room temperature, and neutralized with 1N NaOH solution. Then, after washing chitin with distilled water, the washed chitin was filtered and dried. The dried chitin was soaked in NaOH solution of 50 wt % for 6 hours at 115° C., and deacetylation was performed. Then, the reaction product was soaked in boiling water, and then filtered, to obtain powdered chitosan. The chitosan powder was identified by checking solubility in aqueous acetic acid solution of 2 wt %.

Conversion of Chitosan into Quaternary Ammonium Salt

The obtained chitosan powder and methyl iodide of 100 wt % based on the total weight of chitosan were added in NaOH solution of 1 wt %, and then stirred for 24 hours at 35° C. The obtained reaction product was neutralized with aqueous acetic acid solution, washed with water, filtered and then dried. The obtained reaction product was confirmed to be quaternary ammonium salt of chitosan (trimethylammonumchitosan iodide) by identifying a sharp peak at 1450 $cm^{-1}$ using an infrared (IR) spectrometer.

Example 1

Alkali cellulose and trimethyl ammonium chitosan iodide were added to water in a ratio of 99:1 (weight basis), and solublized at room temperature. The obtained aqueous cellulose solution was found to be homogeneous by identifying using a polarized light microscope the fact that it shows no phase separation. Then, the aqueous cellulose solution was filtered and deaerated to adjust its concentration to 10 wt %. The aqueous cellulose solution was put into a spinning module, and the aqueous cellulose solution was wet-spun to produce a rayon fiber into water of approximately 4° C. via a nozzle having diameter of 0.06 mm by applying nitrogen gas at approximately 100 psi. Here, take-up rate of the fiber was 35 m/min. After the take-up, the fiber was washed with distilled water and dried, resulting in rayon fiber whose single filament has a thickness of approximately 10 denier (d).

Examples 2~4

Rayon fibers were produced by the same method as Example 1, except that the compositions of the coagulating bath were changed. That is, solutions of 4° C. each containing zinc sulfate ($ZnSO_4$) of 20 wt % (Example 2), calcium chloride ($CaCl_2$) of 20 wt % (Example 3), and alginic acid of 10 wt % and calcium chloride ($CaCl_2$) of 5 wt % were used as the coagulating bath.

Examples 5~24

Rayon fibers were produced by the same method as Example 1, except that the compositions of the aqueous cellulose solution and coagulating bath were changed as shown in Tables 1 and 2.

TABLE 1

| | composition of cellulose solution | | | composition of coagulating bath | | | | properties of rayon fiber | | | antibacterial property | |
|---|---|---|---|---|---|---|---|---|---|---|---|---|
| Example | alkali cellulose (w %) | TMACl[#] (w %) | alginic acid (w %) | $ZnSO_4$ (w %) | $CaCl_2$ (w %) | chitosan (w %) | alginic acid (w %) | solubility (or water resistance) | tensile strength (g/d) | extension ratio (%) | SA[#] (mm) | KP[#] (mm) |
| 1 | 99 | 1 | — | — | — | — | — | insoluble in boiling water | 2.8 | 8.6 | S | S |
| 2 | 99 | 1 | — | 20 | — | — | — | insoluble in boiling water | 3.2 | 7.5 | S | S |
| 3 | 99 | 1 | — | — | 20 | — | — | insoluble in boiling water | 3.0 | 7.8 | S | S |
| 4 | 99 | 1 | — | — | 5 | — | 10 | insoluble in boiling water | 4.3 | 6.2 | M | M |
| 5 | 90 | 10 | — | — | — | — | — | soluble at above 90° C. | 2.6 | 9.4 | S | S |
| 6 | 90 | 10 | — | 20 | — | — | — | soluble at above 90° C. | 2.9 | 7.8 | S | S |
| 7 | 90 | 10 | — | — | 20 | — | — | soluble at above 90° C. | 2.9 | 8.5 | S | S |
| 8 | 90 | 10 | — | — | 5 | — | 10 | insoluble in boiling water | 3.8 | 7.3 | M | M |
| 9 | 80 | 20 | — | — | — | — | — | soluble at 80~90° C. | 2.5 | 10.7 | S | S |
| 10 | 80 | 20 | — | 20 | — | — | — | soluble at 80~90° C. | 2.6 | 11.4 | S | S |

TABLE 1-continued

| | composition of cellulose solution | | composition of coagulating bath | | | | properties of rayon fiber | | | antibacterial property | |
|---|---|---|---|---|---|---|---|---|---|---|---|
| | alkali | | alginic | | | | | | | | |
| Example | cellulose (w %) | TMACl# (w %) | acid (w %) | ZnSO4 (w %) | CaCl2 (w %) | chitosan (w %) | alginic acid (w %) | solubility (or water resistance) | tensile strength (g/d) | extension ratio (%) | SA# (mm) | KP# (mm) |
| 11 | 80 | 20 | — | — | 20 | — | — | soluble at 80~90° C. | 2.8 | 12.6 | S | S |
| 12 | 80 | 20 | — | — | 5 | — | 10 | insoluble in boiling water | 3.5 | 7.1 | M | M |

: TMACl; Trimethylammoniumchitosan iodide, SA; *staphylococcous aureus*, KP; *klepsiella pneumoniae*

TABLE 2

| | composition of cellulose solution | | composition of coagulating bath | | | | properties of rayon fiber | | | antibacterial property | |
|---|---|---|---|---|---|---|---|---|---|---|---|
| | alkali | | alginic | | | | | | | | |
| Example | cellulose (w %) | TMACl# (w %) | acid (w %) | ZnSO4 (w %) | CaCl2 (w %) | chitosan (w %) | alginic acid (w %) | solubility (or water resistance) | tensile strength (g/d) | extension ratio (%) | SA# (mm) | KP# (mm) |
| 13 | 70 | 30 | — | — | — | — | — | soluble at 70° C. | 2.5 | 11.2 | S | S |
| 14 | 70 | 30 | — | 20 | — | — | — | soluble at 70° C. | 2.8 | 8.8 | S | S |
| 15 | 70 | 30 | — | — | 20 | — | — | soluble at 70° C. | 3.0 | 9.7 | S | S |
| 16 | 70 | 30 | — | — | 5 | — | 10 | insoluble in boiling water | 3.2 | 10.5 | M | M |
| 17 | 60 | 40 | — | — | — | — | — | soluble at 55~59° C. | 2.1 | 11.4 | S | S |
| 18 | 60 | 40 | — | 20 | — | — | — | soluble at 55~59° C. | 2.6 | 8.7 | S | S |
| 19 | 60 | 40 | — | — | 20 | — | — | soluble at 55~59° C. | 2.5 | 9.8 | S | S |
| 20 | 60 | 40 | — | — | 5 | — | 10 | insoluble in boiling water | 3.2 | 11.2 | M | M |
| 21 | 50 | 50 | — | — | — | — | — | soluble at 40~45° C. | 1.8 | 13.2 | S | S |
| 22 | 50 | 50 | — | 20 | — | — | — | soluble at 40~45° C. | 2.4 | 9.5 | S | S |
| 23 | 50 | 50 | — | — | 20 | — | — | soluble at 40~45° C. | 2.3 | 11.3 | S | S |
| 24 | 50 | 50 | — | — | 5 | — | 10 | insoluble in boiling water | 2.7 | 12.8 | M | M |

: TMACl; Trimethylammoniumchitosan iodide, SA; *staphylococcous aureus*, KP; *klepsiella pneumoniae*

Example 25

Alkali cellulose and sodium alginate (No. 18094-7, Aldrich) were mixed in a ratio of 99:1 (weight basis), and solublized in water at room temperature. The obtained aqueous cellulose solution was found to be homogeneous by identifying using a polarized light microscope the fact that it shows no phase separation. Then, the aqueous cellulose solution was filtered and deaerated to adjust its concentration to 10 wt %. The cellulose solution was put into a spinning module, and the cellulose solution was wet-spun to produce a rayon fiber into water of approximately 4° C. via a nozzle having a diameter of 0.06 mm by applying nitrogen gas at approximately 100 psi. Here, the take-up rate of the fiber was 35 m/min. After the take-up, the fiber was washed with distilled water and dried, resulting in rayon fiber whose single filament has a thickness of approximately 10 denier (d).

Examples 26~28

Rayon fibers were produced by the same method as Example 25, except that the compositions of the coagulating bath were changed. That is, aqueous solutions of 4° C. each containing zinc sulfate (ZnSO4) of 20 wt % (Example 26), calcium chloride (CaCl2) of 20 wt % (Example 27), and chitosan of 10 wt % and calcium chloride (CaCl2) of 5 wt % were used as the coagulating bath.

Example 29~48

Rayon fibers were produced by the same method as Example 25, except that the compositions of the cellulose solution and coagulating bath were changed as shown in Tables 3 and 4.

The mechanical properties of the rayon fibers produced by Examples 1 through 48 are tabulated in Tables 1 through 4.

Referring to Tables 1 through 4, the rayon fibers produced by the examples have a tensile strength of 1.6~4.3 g/d, extension ratio of 6.2~14.8%, and antibacterial characteristics, which are suitable for use in clothing.

TABLE 3

| | composition of cellulose solution | | | composition of coagulating bath | | | | | properties of rayon fiber | | | |
|---|---|---|---|---|---|---|---|---|---|---|---|---|
| | alkali | | alginic | | | | alginic | solubility | tensile | extension | antibacterial property | |
| Example | cellulose (w %) | TMACl[#] (w %) | acid (w %) | ZnSO$_4$ (w %) | CaCl$_2$ (w %) | chitosan (w %) | acid (w %) | (or water resistance) | strength (g/d) | ratio (%) | SA[#] (mm) | KP[#] (mm) |
| 25 | 99 | — | 1 | — | — | — | — | insoluble in boiling water | 2.4 | 10.7 | I | I |
| 26 | 99 | — | 1 | 20 | — | — | — | insoluble in boiling water | 2.9 | 11.8 | I | I |
| 27 | 99 | — | 1 | — | 20 | — | — | insoluble in boiling water | 2.7 | 12.6 | I | I |
| 28 | 99 | — | 1 | — | 5 | 10 | — | insoluble in boiling water | 4.1 | 7.3 | S | S |
| 29 | 90 | — | 10 | — | — | — | — | soluble at above 90° C. | 2.6 | 13.2 | I | I |
| 30 | 90 | — | 10 | 20 | — | — | — | soluble at above 90° C. | 2.8 | 12.5 | I | I |
| 31 | 90 | — | 10 | — | 20 | — | — | soluble at above 90° C. | 2.6 | 12.7 | I | I |
| 32 | 90 | — | 10 | — | 5 | 10 | — | insoluble in boiling water | 3.7 | 8.3 | S | S |
| 33 | 80 | — | 20 | — | — | — | — | soluble at 80~90° C. | 2.3 | 12.8 | M | M |
| 34 | 80 | — | 20 | 20 | — | — | — | soluble at 80~90° C. | 2.7 | 12.4 | M | M |
| 35 | 80 | — | 20 | — | 20 | — | — | soluble at 80~90° C. | 2.6 | 13.4 | M | M |
| 36 | 80 | — | 20 | — | 5 | 10 | — | insoluble in boiling water | 3.4 | 8.7 | S | S |

[#]: TMACl; Trimethylammoniumchitosan iodide, SA; *staphylococcous aureus*, KP; *klepsiella pneumoniae*

TABLE 4

| | composition of cellulose solution | | | composition of coagulating bath | | | | | properties of rayon fiber | | | |
|---|---|---|---|---|---|---|---|---|---|---|---|---|
| | alkali | | alginic | | | | alginic | solubility | tensile | extension | antibacterial property | |
| Example | cellulose (w %) | TMACl[#] (w %) | acid (w %) | ZnSO$_4$ (w %) | CaCl$_2$ (w %) | chitosan (w %) | acid (w %) | (or water resistance) | strength (g/d) | ratio (%) | SA[#] (mm) | KP[#] (mm) |
| 37 | 70 | — | 30 | — | — | — | — | soluble at 70° C. | 2.1 | 12.6 | M | M |
| 38 | 70 | — | 30 | 20 | — | — | — | soluble at 70° C. | 2.3 | 11.5 | M | M |
| 39 | 70 | — | 30 | — | 20 | — | — | soluble at 70° C. | 2.2 | 12.4 | M | M |
| 40 | 70 | — | 30 | — | 5 | 10 | — | insoluble in boiling water | 3.2 | 11.7 | S | S |
| 41 | 60 | — | 40 | — | — | — | — | soluble at 55~59° C. | 1.8 | 13.3 | M | M |
| 42 | 60 | — | 40 | 20 | — | — | — | soluble at 55~59° C. | 2.4 | 11.6 | M | M |
| 43 | 60 | — | 40 | — | 20 | — | — | soluble at 55~59° C. | 2.1 | 12.7 | M | M |
| 44 | 60 | — | 40 | — | 5 | 10 | — | insoluble in boiling water | 3.1 | 12.4 | S | S |
| 45 | 50 | — | 50 | — | — | — | — | soluble at 40~45° C. | 1.6 | 14.8 | M | M |
| 46 | 50 | — | 50 | 20 | — | — | — | soluble at 40~45° C. | 2.2 | 11.4 | M | M |
| 47 | 50 | — | 50 | — | 20 | — | — | soluble at 40~45° C. | 2.0 | 10.6 | M | M |

TABLE 4-continued

| | composition of cellulose solution | | | composition of coagulating bath | | | | properties of rayon fiber | | | antibacterial property | |
|---|---|---|---|---|---|---|---|---|---|---|---|---|
| | alkali | | alginic | | | | alginic | solubility | tensile | extension | | |
| Example | cellulose (w %) | TMACl# (w %) | acid (w %) | ZnSO4 (w %) | CaCl2 (w %) | chitosan (w %) | acid (w %) | (or water resistance) | strength (g/d) | ratio (%) | SA# (mm) | KP# (mm) |
| 48 | 50 | — | 50 | — | 5 | 10 | — | insoluble in boiling water | 2.8 | 12.3 | S | S |

: TMACl; Trimethylammoniumchitosan iodide, SA; *staphylococcous aureus*, KP; *klepsiella pneumoniae*

Meanwhile, depending on the composition of the coagulating bath for wet-spinning, the rayon fiber may have solubility or water-resistivity. That is, as in Examples 4, 8, 12, 16, 20 and 24, where the aqueous cellulose solution containing cellulose and trimethylammoniumchitosan iodide is wet-spun into the lating bath containing alginic acid, water-resistant fibers which are able to withstand boiling water can be obtained. Meanwhile, as in Examples 28, 32, 36, 40, 44 and 48, where the aqueous cellulose solution containing alkali cellulose and alginic acid is used, water-resistant fibers which are able to withstand boiling water can be obtained by spinning the cellulose solution into the coagulating bath containing chitosan. Also, as in Examples 1 through 4 and Examples 25 through 28 containing small amounts of trimethylammonium chitosan iodide or alginic acid, water-resistant fiber can be obtained regardless of the composition of the coagulating bath.

Meanwhile, the rayon fibers obtained from the examples other than the above-mentioned examples show water-solubility. The solubilization temperature tends to decrease as the content of trimethylammoniumchitosan iodide or alginic acid increases. The soluble rayon fiber can be recycled as spinning solution by being solublized in water after use, so that the soluble rayon fiber is environmentally favored.

The cellulose solution of the present invention can be used as sources for cosmetics and foods industries as well as for producing rayon fibers. Also, the rayon fiber obtained by spinning the aqueous cellulose solution can be used for clothing, suture for surgery, gauze due to its good mechanical properties as well as high hygroscopic property, antibacterial property and flame retardancy.

What is claimed is:

1. An aqueous cellulose solution comprising:
   a first component containing at least one selected from the group consisting of alkali cellulose and cellulose derivatives; and
   a second component containing at least one selected from the group consisting of soluble chitosan and chitosan derivatives, wherein the first and second components are homogeneously mixed without phase separation.

2. The aqueous cellulose solution of claim 1, wherein the total content of the first and second components is 4~12 wt % based on the total weight of the cellulose solution.

3. The aqueous cellulose solution of claim 1, wherein the cellulose derivative is at least one selected from the group consisting of carboxymethyl cellulose, hydroxyethyl cellulose, hydroxypropyl cellulose, sulfated cellulose, methyl cellulose, ethyl cellulose, n-propyl cellulose, and isopropyl cellulose.

4. The aqueous cellulose solution of claim 1, wherein the chitosan derivative is at least one selected from the group consisting of alkali chitin, carboxymethyl chitin, hydroxypropyl chitosan, sulfated chitosan, succinyl chitosan, chitosan lactate, sodium chitosan acetate, and quaternary ammonium salt of chitosan.

5. The aqueous cellulose solution of claim 4, wherein the quaternary ammonium salt of chitosan is at least one selected from the group consisting of trimethylammonium chitosan halide, triethylammonium chitosan halide, and triisopropylammonium chitosan halide.

6. The aqueous cellulose solution of claim 1, wherein the cellulose solution further comprises a base compound of 0.01~5 wt % based on the total weight of the cellulose solution.

7. The aqueous cellulose solution of claim 6, wherein the base compound is at least one selected from the group consisting of sodium hydroxide (NaOH), potassium hydroxide (KOH), calcium hydroxide (Ca(OH)$_2$), and magnesium hydroxide (Mg(OH)$_2$).

8. A rayon fiber produced by wet-spinning an aqueous cellulose solution into a coagulating bath, wherein
   the aqueous cellulose solution comprises:
      a first component containing at least one selected from the group consisting of alkali cellulose and cellulose derivatives; and
      a second component containing at least one selected from the group consisting of soluble chitosan and chitosan derivatives, or alternatively, at least one selected from the group consisting of soluble alginic acid and alginic acid derivatives, and
   the first and second components are homogeneously mixed without phase separation.

9. The rayon fiber of claim 8, wherein the total content of the first and second components is 4~12 wt % based on the total weight of the cellulose solution.

10. The rayon fiber of claim 8, wherein the cellulose derivative is at least one selected from the group consisting of carboxymethyl cellulose, hydroxyethyl cellulose, hydroxypropyl cellulose, sulfated cellulose, methyl cellulose, ethyl cellulose, n-propyl cellulose, and isopropyl cellulose.

11. The rayon fiber of claim 8, wherein the chitosan derivative is at least one selected from the group consisting of alkali chitin, carboxymethyl chitin, hydroxypropyl chitosan, sulfated chitosan, succinyl chitosan, chitosan lactate, sodium chitosan acetate, and quaternary ammonium salt of chitosan.

12. The rayon fiber of claim 11, wherein the quaternary ammonium salt of chitosan is at least one selected from the group consisting of trimethylammonium chitosan halide, triethylammonium chitosan halide, and triisopropylammonium chitosan halide.

13. The rayon fiber of claim 8, wherein the alginic acid derivative is at lease one selected from the group consisting of sodium alginate, calcium alginate, potassium alginate, and magnesium alginate.

14. The rayon fiber of claim 8, wherein the cellulose solution further comprises a base compound of 0.01~5 wt % based on the total weight of the cellulose solution.

15. The rayon fiber of claim 14, wherein the base compound is at least one selected from the group consisting of sodium hydroxide (NaOH), potassium hydroxide (KOH), calcium hydroxide ($Ca(OH)_2$), and magnesium hydroxide ($Mg(OH)_2$).

16. The rayon fiber of claim 8, wherein the coagulating bath is water.

17. The rayon fiber of claim 8, wherein the coagulating bath is water containing 5~25 wt % of at least one selected from the group consisting of zinc sulfate, sodium sulfate, ammonium sulfate, sodium chloride, and calcium chloride.

18. The rayon fiber of claim 8, wherein the coagulating bath is water containing 3~8 wt % of at least one selected from the group consisting of chitosan and chitosan derivatives, and 5~25 wt % of at least one selected from the group consisting of zinc sulfate, sodium sulfate, ammonium sulfate, sodium chloride, and calcium chloride.

19. The rayon fiber of claim 8, wherein the coagulating bath is water containing 3~8 wt % of at least one selected from the group consisting of alginic acid and alginic acid derivatives, and 5~25 wt % of at least one selected from the group consisting of zinc sulfate, sodium sulfate, ammonium sulfate, sodium chloride, and calcium chloride.

20. The rayon fiber of claim 8, wherein the temperature of the coagulating bath is 4~15° C.

* * * * *